Patented May 30, 1950

2,509,764

UNITED STATES PATENT OFFICE 2,509,764

INSECTICIDE COMPOSITION

Gerarda Francisca Elisa Maria Dierick, Amsterdam, Netherlands, assignor to Shell Development Company, San Francisco, Calif., a corporation of Delaware No Drawing. Application February 13, 1947, Serial No. 728,384. In the Netherlands February 20, 1946

5 Claims. (Cl. 167—31)

This invention relates to a method of combating noxious organisms and more particularly organisms which are harmful in agriculture, horticulture and fruit growing. More specifically, this invention pertains to a novel insecticidal and fungicidal composition comprising a suitable liquid or solid base having dispersed therein a mixture of at least two insecticidal agents which function in such a manner as to produce a synergistic effect, which composition is extremely toxic to insects, pests and their larvae, but which is substantially non-injurious to plants, higher animals and human beings.

It is well known that nitrophenolic compounds or their salt derivatives are effective insecticidal agents. Of this class of compounds the dinitro alkyl phenols or their salts are particularly useful although certain members of this series are more potent or more effective insecticidal agents than others. By this is meant that specific dinitro alkyl phenolic compounds and their salts are more toxic to the same or allied pests or insects as well as to a wide variety of different pests and insects even when such compounds are used in the same concentrations.

Although dinitro phenolic compounds are effective toxicants to insects they exert a harmful effect on plants and foliage even when employed in very low concentrations. Dinitro mono or polyalkyl phenols, such as dinitro-cresols, dinitro-octyl phenol, dinitro cyclohexyl phenol or salts thereof when applied in concentrations to be effective as insect toxicants either as dusts, aqueous suspensions, emulsions or in liquid hydrocarbons or other organic mediums, cause severe injury to plants, resulting in defoliation, retardation of normal development and metabolic disturbances; also they are toxic to animals and human beings. Additionally, the effectiveness of these compounds is of rather short duration due to the fact that the free dinitro phenols are relatively volatile and therefore fail to provide adequate protection for extended periods of time since it is difficult to maintain such toxicants in contact or adjacent to the insect infestation. The salt derivatives of the nitro phenolic compounds although substantially non-volatile, are very toxic to plant life and are sufficiently soluble in aqueous mediums so as to be readily leached out or washed away by rains and the like from areas of infestation. To compensate for such losses increased amounts of the toxicants are required which result in increased plant injury, as well as cost.

To further complicate this problem the medium or carrier, to which nitro phenols are added or in which they are dispersed, must be selected with great care because of the sensitiveness and reactivity of the toxicant toward the carriers and the possible phytotoxic properties of the carrier. Thus, poly nitro phenols when incorporated with finely divided solids such as bentonite, kieselguhr, diatomaceous earth, pipe clay, talc, lime, chalk, gypsum and the like react to form alkaline earth and alkali metal phenolates, which become increasingly soluble in aqueous mediums and are thus lost due to their being washed away and also complicate the plant injury problem. Non-reactive solids such as sawdust, bran, flour meal and other coarsely ground wood products are generally unsuited as insecticidal carriers since it is difficult to form homogenous dispersion therewith as well as the failure of the dispersant to adhere to insect infested areas which are being treated. Emulsions as carrier medium are also disadvantageous since nitrophenolic compounds as a class are partially soluble in water so that gradually the concentration of the toxicant in the oil phase is diminished, markedly reducing the toxicity of such compositions. To prevent such losses, acidic buffering agents are sometimes added. This practice, however, increases the cost of the product and requires careful control of the pH of the composition which in actual commercial operations is difficult to maintain. Petroleum hydrocarbons such as kerosene, petroleum naphthas, mineral oil and the like are effective carriers, but are either too volatile or are extremely detrimental, since they produce serious physiological disturbances in the plants apparently due to interference with the plants, transpiration and its adsorption into the plant circulating system causing metabolic disturbances. To retard or reduce the adsorption rate of the oil into the circulating system of the plants or vary the rate of evaporation, antipenetrates are sometimes added. This has proved of little aid in reducing injury to plants and greatly increases the cost of the product.

It is an object of this invention to provide an effective insecticidal composition for combating insect and pest infested areas. It is another object of this invention to provide an insecticidal composition comprising a mixture of toxicants which exert a synergistic effect, and whose toxic efficiency is not impaired by the carrier medium. Still another object of this invention is to provide an improved insecticidal composition the active ingredients of which are extremely toxic to insect pests in such low concentrations as to be non-injurious to contacting plants. Furthermore, it is an object of this invention to provide insecticidal compositions which are toxic to insect infested areas for long intervals of time but which are non-toxic to plants, higher animals and human beings. Other objects of this invention will be apparent from the following description:

It has now been discovered that by admixing in any suitable inert carrier a mixture of a dinitromethylphenol and the salt of a dinitromethylphenol and ammonia, a synergistic effect is produced which results in an extremely potent toxicant for combating insect infested areas which is substantially non-toxic to plants, higher animals or human beings. This combination of a dinitro-methylphenol and its ammonium salt produces a toxicant which is far more potent than either of these compounds when used alone or as would be expected from such a combination. Rather a synergistic effect is produced from this combination, resulting in a completely effective toxicant for combating insect infested areas and having none of the inhert detrimental and toxic properties to plants, animals or human beings. It appears that this combination of toxicants accentuates all the toxic properties of each additive to a maximum towards insects, while inhibiting their toxic properties to a minimum towards plants, domestic animals and human beings. Furthermore the toxicity of this combination of insecticidal agents at fixed concentrations is not diminished regardless of the carrier in which they are dispersed, and it can be much lower than the concentration of the individual compounds generally used in present known insecticidal compositions and still maintain its potent toxic properties toward insects. In addition, the effective toxic life of the insecticidal mixture is increased many fold over that of the individual toxicants.

The dinitromethylphenol compound which is one component of the insecticidal mixture of this invention may be represented by the structural formula:

I.

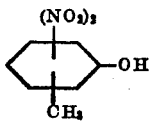

Specific compounds which fall within the scope of the above general structure formula and which are particularly useful as one of the components of toxicants of this invention are: dinitro cresols such as 2,4 dinitro-6-methyl-phenol, 2,5 dinitro-6-methyl-phenol, 2,4 dinitro-5-methyl-phenol, 2,6 dinitro-5-methyl-phenol, 2,6 dinitro-4-methyl-phenol, 2,5 dinitro-4-methyl phenol, etc., and mixtures thereof.

The second constituent which comprises the insect toxicant composition of this invention are the ammonium salts of dinitromethylphenols and can be represented by the general structural formula:

II.

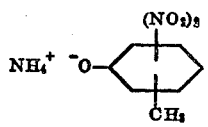

These salts may be prepared by neutralizing the dinitromethylphenol with ammonia. The reaction can be carried out in a suitable diluent or solvent and if desired in the presence of a filler such as kieselguhr, bentonite, diatomaceous earth, talc, chalk, gypsum and the like. In some cases the diluent can be omitted and the salt can be prepared by simply admixing the nitro compound with a filler as mentioned and passing gaseous ammonia through the mixture. The salt thus obtained can be admixed with a calculated amount of the dinitromethylphenol compound and if desired compressed into tablets by the addition of starch, amylum and the like. The tablets can be dispersed in water to a desired concentration in situ where the composition can be used as an insecticidal spray for combating insect infested areas.

The proportional relationship of the two toxicants of this invention can vary over wide limits of about 20% to 60% of the dinitromethylphenol to about 80% to 40% of its salt of ammonia. In preparing a concentrate the toxicant mixture can comprise from about 20% to about 80% by weight of the composition regardless of whether the carrier is liquid or solid. On actual application the concentrate can be diluted so that when applied either as a dust or spray it comprises from less than 0.1% to not more than about 5% by weight of the composition.

Solid carriers for toxicant mixtures of this invention can be any of the inert solids mentioned above as well as ligno-cellulosic materials such as finely divided nut shells, e. g. walnut shell flour, wood, e. g. redwood flour, bark and the like; fuller's earth, cryolite, volcanic ash, finely divided carbon, inorganic phosphates and the like, and applied as dust to combat insect infested areas. Spray compositions can be made by dispersing the toxicants or the toxicants and solid carriers dispersed in water, emulsions, liquid petroleum products or other suitable liquid carriers. If emulsions are used as carriers suitable emulsifying detergents and wetting agents are added in order to form a stable homogeneous product. Among such agents may be glyceryl esters, e. g. glyceryl oleate, alkali metal caseinates, e. g. sodium caseinate, metal salts of naphthenic acid, alkali salts of petroleum sulfonates, neutralized sulfuric acid derivatives of fatty acids and their esters, e. g. sodium lauryl sulfate, sodium sulfo alkyl succinic acid, sodium stearate, blood albumen and the like. With the emulsion can be admixed before, during or after the addition of a toxicant mixture of this invention other insecticidal and fungicidal agents. These may include phenothiazine, phenothioxin, rotenone, organic thiocyanates, sulfur copper sprays and the like.

Oils comprising emulsions generally need not exceed above by about 10% by weight and representative oils can be mineral oils, preferably highly saturated non-evaporating oils; vegetable oils, e. g. corn oil, cottonseed oil, soy bean oil, tung oil, castor oil; fish oil, e. g. menhaden oil, sardine oil; animal oils, e. g. lard oil, neat's foot oil, and the like. In addition, synthetic oils can be used, such as poly-olefin oils, poly-alkylene oxides, polymers of polyalkylene oxide and monohydric alcohols; halogenated diphenyls and diphenyl oxides, esters of dicarboxylic acids and the like.

Instead of using solid carriers, emulsion or water, a straight, preferably highly saturated mineral oil or synthetic oils can be used as carrier for the toxicant mixtures of this invention.

The following examples are illustrative but are not to be construed as limiting the invention.

Example

A mixture of about 28 parts by weight of 3,5 dinitro-2-methyl-phenol, 46 parts by weight of ammonium salt of 3,5 dinitro-2-methyl phenol and 26 parts by weight of kieselguhr was prepared by thoroughly mixing and grinding these components. About 0.10 to 0.14 parts by weight of this mixture was dispersed in 100 parts by weight of water by stirring. This insecticidal composition was used to spray apple trees covered with plant lice eggs.

Under otherwise equal conditions a product was prepared by dispersing about 0.10 to 0.15% of 3,5 dinitro-2-methyl phenol in 100 parts of water and still another product was prepared containing about 0.11 parts of ammonium salt of 3,5 dinitro-2-methyl phenol in 100 parts by weight of water and these were also used to spray apple trees covered with plant lice eggs. The comparative results of the three compositions are tabulated below:

| Composition | Per cent Additive in Spray by wt. | Per cent Killed of Plant Lice | Remarks |
| --- | --- | --- | --- |
| Mixture of 3,5 dinitro-2-methyl phenol and ammonia salt of 3,5 dinitro-2-methyl phenol. | 0.1 to 0.14 | 100 | Tree foliage not injured. |
| 3,5 dinitro-2-methyl phenol | 0.1 to 0.15 | max. of 40 | Tree foliage badly injured. |
| Ammonium salt of 3,5 dinitro-2-methyl phenol | 0.1 to 0.15 | 40 to 75 | Do. |
| Mineral Oil | | 0 | Do. |

Compositions of this invention are also equally effective against various other insects, pests and their eggs and larvae such as eggs of the milkweed bug, citrus red spiders, apple aphis, codling moth larvae, thrips, mites, walnut husk fly, citricola scale and the like. The insecticidal compositions can be applied by any means to the infested areas.

The present invention having thus been fully described is not to be limited by any specific examples which have been presented herein solely for the purpose of illustration.

I claim as my invention:

1. An insect control composition comprising an inert vehicle and dispersed therein at least two active ingredients, one being a dinitromethylphenol and another being the salt of a dinitromethylphenol and ammonia, the ratio of said ingredients being between 1:4 and about 3:2, said ingredients being present in amounts sufficient to render said compositions toxic to insect life.

2. An insect control composition comprising an inert vehicle and dispersed therein at least two active ingredients, one being a dinitromethylphenol and another being the salt of a dinitromethylphenol and ammonia, the ratio of said ingredients being about 2:5, said ingredients being present in amounts sufficient to render said compositions toxic to insect life.

3. An insect control composition comprising an inert solid carrier and dispersed therein at least two active ingredients, one being 3,5-dinitro-2-methylphenol and another being the salt of 3,5-dinitro-2-methylphenol and ammonia, the ratio of said ingredients being between about 1:4 and about 3:2, said ingredients being present in amounts sufficient to render said composition toxic to insect life.

4. An insect control composition comprising an inert vehicle and dispersed therein at least two active ingredients, one being a dinitro-2-methylphenol and another being the salt of a dinitro-2-methylphenol and ammonia, the ratio of said ingredients being between about 1:4 and about 3:2, said ingredients being present in amounts sufficient to render said composition toxic to insect life.

5. An insect control composition comprising an inert solid carrier and dispersed therein at least two active ingredients, one being a dinitromethylphenol and another being the salt of a dinitromethylphenol and ammonia, the ratio of said ingredients being between about 1:4 and about 3:2, said ingredients being present in amounts sufficient to render said composition toxic to insect life.

GERARDA FRANCISCA ELISA
MARIA DIERICK.

REFERENCES CITED

The following references are of record in the file of this patent:

UNITED STATES PATENTS

| Number | Name | Date |
| --- | --- | --- |
| 2,222,486 | Moore | Nov. 19, 1940 |
| 2,328,505 | Smith | Aug. 31, 1943 |
| 2,365,056 | Coleman | Dec. 12, 1944 |
| 2,367,534 | Smith | Jan. 16, 1945 |
| 2,369,137 | Coleman | Feb. 13, 1945 |